United States Patent [19]
Crespi

[11] 4,323,179
[45] Apr. 6, 1982

[54] METERING DEVICE FOR LIQUIDS, IN PARTICULAR ALCOHOLIC LIQUORS OR SPIRITS

[76] Inventor: Carlo Crespi, Via Bertinoro, 9-Milano, Italy

[21] Appl. No.: 149,806

[22] Filed: May 14, 1980

[51] Int. Cl.³ .............................................. G01F 11/28
[52] U.S. Cl. ...................................... 222/449; 222/453
[58] Field of Search ............................. 222/437–439, 222/440, 447, 453, 450, 457, 463, 288, 449

[56] References Cited

U.S. PATENT DOCUMENTS

| 274,195 | 3/1883 | Holland | 222/288 |
| 645,706 | 3/1900 | Grant | 222/453 |
| 2,438,002 | 3/1948 | Duggan | 222/450 |
| 2,532,787 | 12/1950 | Romyns | 222/453 |
| 2,759,641 | 8/1956 | Hersh | 222/453 |

*Primary Examiner*—H. Grant Skaggs
*Attorney, Agent, or Firm*—Guido Modiano; Albert Josif

[57] ABSTRACT

A metering device for liquids, particularly liquors and alcoholic drinks, is shaped for application to a bottle or other liquid container for pouring metered amounts of the contents thereof into a glass. The device comprises a cylindrical metering chamber having openings on opposite bases and valve members for alternately opening these openings. The valve members are actuated in unison by gravity-operated members arranged on one end of a control lever having the other end journalled to the valve members. When the bottle is progressively tilted to pour its contents into a glass the metering chamber is filled as soon as the bottle is inclined past the horizontal, and then the gravity-operated members suddenly cause closing of the communication between the metering chamber and the bottle and opening of the metering chamber to the outside, thus causing pouring of the metered amount into the glass.

6 Claims, 8 Drawing Figures

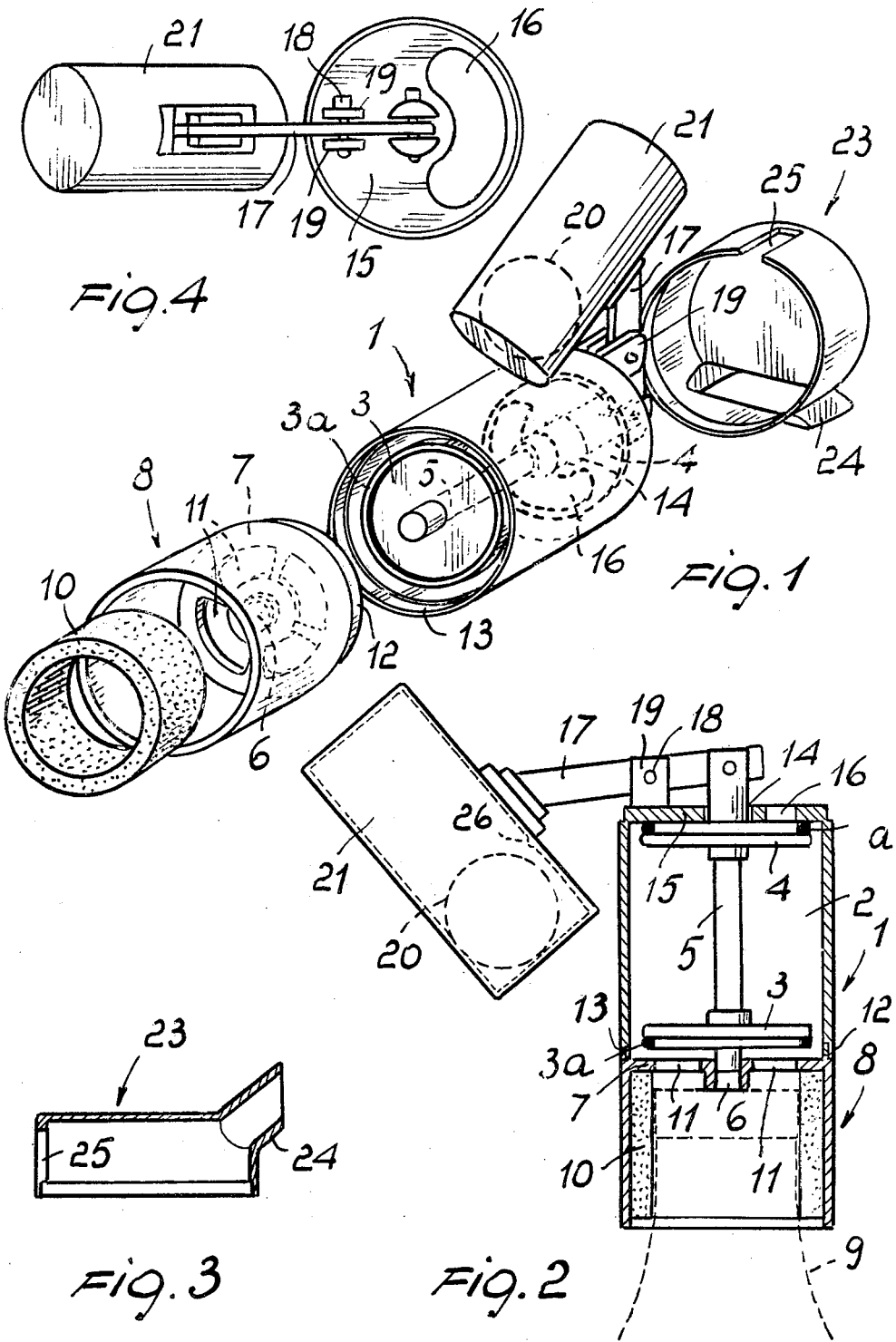

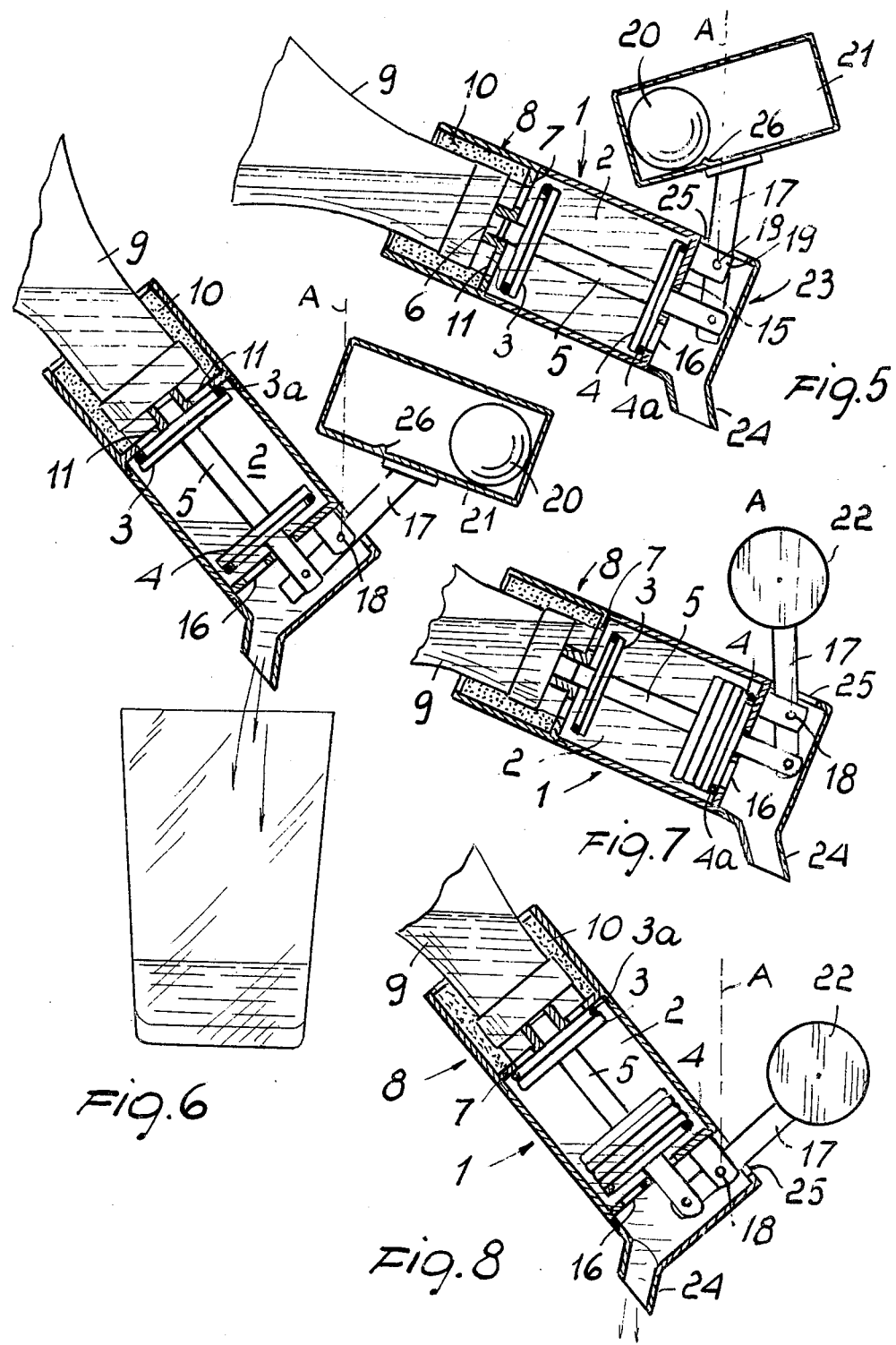

METERING DEVICE FOR LIQUIDS, IN PARTICULAR ALCOHOLIC LIQUORS OR SPIRITS

BACKGROUND OF THE INVENTION

This invention relates to a metering device for liquids, in particular alcoholic liquors or spirits, which is adapted for application to bottles and other containers for liquids.

It is known that the metering of alcoholic liquors, in particular spirits, aperitives, and the like drinks, at the time of serving them, involves substantially two basic problems: one problem arises from the fact that each type of alcoholic liquor must be served in a different amount, e.g. an aperitif should be served in a larger amount than a bitter, and the latter in a larger amount than a strong alcoholic liquor, thereby one is required to know in advance the standard amount in which a given drink is to be served; and the other problem is that of obtaining exactly this standard amount.

Also known is that the metering out is mostly carried out visually and in accordance with past experience, such that errors in the metered amounts can be easily made. In the instance of a bar, pub or other public serving outlet, an error in the amounts served may lead to dissatisfaction of the customer, or alternatively, if repeated over a sufficient time period, result in an appreciable damage for the keeper.

In an attempt at obviating such drawbacks, automatic metering devices for bars and pubs have been introduced, whereby the metering operation is carried out by placing a glass or goblet under a delivery spout over which a bottle, containing the liquor or other drink to be served in metered amounts, is placed upside down. Such metering devices are constructed to accommodate several bottles at a time, each bottle being connected to a respective delivery spout, such as to enable, in accordance with the type of drink involved (aperitif, bitter, strong alcoholic liquor, etc.) the exact amount to be metered which corresponds to the standard amount provided.

However, these devices do not lend themselves to domestic applications, and have some limitations. First of all, these devices cannot be utilized for all the range of liquors normally made available at a bar or pub, but only the most frequently demanded ones, because a very large number of such devices would otherwise become necessary, with attendant increase in costs and space requirements. Secondly, the complication should be considered which originates from the necessity of replacing the various bottles upon the emptying thereof, which operation can only be effected after the bottles have been completely emptied as dictated by the upside down position of the bottles. Moreover, it should also be considered that during all the time required to fill the glass or goblet with the metered amount, the barman must hold the glass or goblet raised and pressed against the lower end of the delivery spout.

SUMMARY OF THE INVENTION

This invention sets out to provide an automatic metering device of universal application, which is suitable for use both in public houses and at home, and implies no waiting time with the glass or goblet held against the metering device. In other words, an automatic metering device should be provided which can be attached directly to a bottle (or other liquid container), and affords the possibility of metering out the beverage contained therein at the very time when the bottle is inverted to pour part of its contents into a glass or goblet.

This object is achieved, according to one aspect of this invention, by providing an automatic metering device for liquids, in particular alcoholic liquors, for application to bottles or other liquid containers, comprising a metering chamber and means for sealingly attaching the device to a bottle or other liquid container, the device being characterized in that on opposite ends of said metering chamber there are provided openings or ports which can be alternately shut off by means of rigidly interconnected valve means, said valve means being associated to gravity-operated control means effective to hold said valve means in a first position where said metering chamber is in communication with the bottle or other liquid container and shut to the outside environment, when the bottle or other liquid container is standing upright or inclined to a predetermined inclined position where the bottom of the bottle or other liquid container is at a higher level than the delivery opening, and to suddenly switch said valve means over to a second position where said chamber is separated from said bottle or other liquid container and open to the outside environment upon said bottle or other liquid container reaching an inclination exceeding said predetermined inclined position.

With a metering device of this type, the metering action occurs automatically upon the bottle (or other liquid container) being inverted to pour its contents into the glass or goblet, because at a first stage, as soon as the bottle is brought to a horizontal or inclined position beyond the horizontal position, the metering chamber is quickly filled as being in communication with the bottle, but no liquid is poured as yet into the glass or goblet, whilst at a further stage, when the bottle is inclined further, a position is reached beyond which the connection between the filled metering chamber and bottle is shut instantaneously, and connection to the outside environment is opened, thereby the contents of the metering chamber is poured fully into the glass or goblet while the bottle, although still inclined to its pouring or serving position, is shut off completely. It will be appreciated from the foregoing that the invention is based upon a seemingly absurd notion, i.e. that of keeping the bottle shut while its contents is to be served and opening it when the contents is instead required to be served. And yet, it is indeed thanks to this feature, which might appear illogical at first sight, that the inventive device affords an accurate metering action through an operation which reproduces but a normal typical operation of pouring liquid from a bottle.

With the automatic metering device according to the invention, it becomes possible to obtain, by varying the capacity of the metering chamber, different amounts of a beverage which are, however, always exactly metered. Thus, by equipping each bottle, depending on the type of beverage contained therein, with a metering device having a capacity matching the standard amount contemplated for that particular beverage, one is enabled to safely pour part of the bottle contents into a vessel to obtain at all times the same standard metered amount, without concerning him/herself with providing a measure of that amount.

BRIEF DESCRIPTION OF THE DRAWINGS

Further features and advantages of the invention will be more clearly understood from the following description of a preferred embodiment thereof, given herein with reference to the accompanying drawings, where:

FIG. 1 is a perspective exploded view of a metering device accoring to the invention;

FIG. 2 is an axial section through the metering device of FIG. 1, as applied to a bottle and without a cap;

FIG. 3 is an axial section through the cap;

FIG. 4 is a plan view of the metering device of the preceding figures, without the cap;

FIGS. 5 and 6 are schematical representations of the device of the preceding figures, shown in two operative positions thereof; and FIGS. 7 and 8 are schematical representations of a detail of a metering device according to the invention, with the gravity-operated control means being simplified and shown in two operative positions thereof.

DESCRIPTION OF THE PREFERRED EMBODIMENTS

With reference initially to FIGS. 1 to 4 of the drawings, a metering device according to the invention comrpises essentially a metering assembly 1 defining a referably cylindrical metering chamber 2 therein, which is at least partly open at its opposite bases. Inside the metering chamber 2, there are axially movable valve means 3 and 4, which comprise of preference two spaced-apart disks interconnected by means of a central stem 5 and intended for alternately shutting the inlet and outlet openings or ports of the metering chamber 2, as will be apparent hereinafter. The disks, 3 and 4, have a smaller diametrical dimension than the diametrical dimension of the metering chamber 2, and seal rings 3a and 4a on the external front surfaces at the edges of the same.

The central stem 5 protrudes outwards from the area defined between the two disks 3 and 4. The stem 5 is guided in sealed relationship, on one side, in a central seat or socket 6 defined in a base 7 of a hollow cylindrical body 8, which is intended for coaxial application to the neck of a bottle 9 and support of the entire metering device. more specifically, the cylindrical body 8 accommodates a hollow cylindrical gasket 10 therein, the inside dimensions whereof are set to match, as the occasion may require, the end dimensions of the neck of the bottle 9 whereto the metering device is to be applied. The base 7 has a plurality of apertures 11, of comparatively large size, e.g. four such apertures.

The body 8 can be removably connected in sealed relationship to the metering assembly 1, e.g. by geometrical engagement of an annular projection 12 of the body 8 within an annular recess 13 of the metering assembly 1, the projection 12 and recess 13 having the same axial dimensions. After establishing the connection, the apertures 11 form inlet openings or ports for the metering chamber 2 and can be shut by the disk 3, since the peripheral portion of the base 7 serves as an abutment surface for the annular gasket or seal 3a of the disk 3 in one of the shut-off positions of the valve assembly 3,4.

The end of the central stem 5 located next to the disk 4 is instead guided in sealed relationship in a central seat or socket 14 of one base 15 of the assembly 1, wherein an outlet or delivery opening or port is formed which can be shut by the disk 4 when the annular seal 4a thereof abuts against the base itself, peripherally with respect to the port 16. The latter has of preference smaller dimensions than the overall ones of the apertures 11.

With the end of the stem 5 which protrudes from the base 15, there are associated gravity-operated control means, effective to control the alternate shutting of the ports or openings, 11 and 16, in a manner which will be explained hereinafter. More specifically, and as shown in FIGS. 1-4, to this end of the stem 5, one end of a control lever 17 is journalled, which is pivoted to the body of the assembly 1 at 18 and carries at its other end one of more weights. The lever 17 is pivoted to the body of the assembly 1, advantageously between two ears 19 rigid with the base 15 of the assembly, on the opposite side with respect to the opening or port 16. The lever arm between the pivot 18 and the end journalled to the stem 5 is preferably shorter than the lever arm between the pivot 18 and the weights placed at the opposite end. The plane of oscillation of the lever 17 is an axial plane of the metering assembly 1 (or anyhow, one parallel to an axial plane) and passes through the delivery port 16. The latter extends symmetrically with respect to said plane.

The weight(s) carried by the lever 17 can be either movable or fixed. One example of a movable weight is shown in FIGS. 1-6, and one example of a fixed weight in FIGS. 7 and 8. In the former case, a movable ball 20 is provided which is movable on a preferably cylindrical housing 21 between two positions whereat it contacts the bases of the housing itself. The latter is attached to the lever 17 such that its axis forms, with the axis of the lever 17, an angle smller than 90° on the side facing the metering device 1. That angle is preferably an angle of 45°.

In the case where fixed weights are provided (FIGS. 7 and 8), the latter can be one or more cylindrical or spherical weights 22 attached to the lever 17 such that their axes or centers extend preferably to intersecate the axis of the lever 17.

That portion of the metering device which comprises the articulation points of the control lever 17 may be advantageously covered by means of a cylindrical cap 23, which can be snap engaged on the metering assembly 1 and provided, at one end with a delivery spout 24, and at the opposite end with a slot 25 for the passage of the lever 17 therethrough. The axis of the spout 24 is advantageously orthogonal with the axis of the housing 21; the cross-sectional configuration of the spout may be either rectangular, circular or otherwise.

The metering device according to the invention is utilized in the following manner.

When the metering device is applied to an open bottle 9 containing the liquid to be metered out, e.g. a liquor, the bottle will be standing upright (FIG. 2), namely in the normal condition in which is is stored; the arrangement of the valve assembly 3,4 is such as to keep the connection of the metering chamber 2 with the inside of the bottle 9 open through the ports 11, and closed the connection of the chamber 2 with the delivery spout 24 and accordingly the outside environment through the opening or port 16. That position is stably set by the weight(s) 20 or 22, the action whereof holds the valve assembly 3,4 pulled up to cause the seal 4a to adhere to the base 15. The metering chamber 2 is obviously empty.

Next, when the bottle 9 is grasped by the user and progressively tilted, as is usual, to pour its contents into a glass or goblet, the situation described hereinabove is not altered initially, not even when the bottle is caused to take a horizontal position. On the contrary, that situation is maintained even after the bottle begins to be inclined past the horizontal, as shown in FIGS. 5 and 7, whilst the bottle bottom is raised progressively up to a higher level than the ports 11 and 16. In fact, the situation remains unchanged until the center of gravity of the assembly comprising the ball 20 and its housing 21 (or weights 22) and the adjacent portion of the lever 17 is located, with respect to the pivot 18 of the lever 17, on the same side as the metering assembly 1, i.e. until said center of gravity remains on left-hand side of a vertical line A, as shown in FIGS. 5 and 7. It will be appreciated that, being the bottle appreciably inclined beyond the horizontal, the metering chamber 2 is quickly filled to capacity regardless of whether the bottle is full or almost empty, while the delivery port 16 continues to be held shut.

As the bottle is inclined further, again in the typical attitude of pouring a drink, a position is reached where said center of gravity shifts, with respect to the pivot 18, to the opposite side of the metering assembly 1, i.e. to the right of the line A. At this moment, there will occur a sudden movement of the valve assembly 3,4 to a fresh stable position whereat the connection of the chamber 2 with the bottle 9 is shut by virtue of the seal or gasket 3a contacting the base 7, while the port 16 is simultaneously opened, which allows the metering chamber 2 to be emptied into the underlying glass or goblet, as shown in FIGS. 6 and 8. The connection with the bottle 9 being shut, the entire contents, and this only, of the metering chamber 2 will be poured out, namely an accurately metered amount of the liquor. As mentioned above, this fresh position is also a stable one, and cannot be modified by further inclining the bottle down. Thus, to obtain a metered amount, it is no longer necessary to take any special precautions, it being sufficient to perform the same movements as are performed of usual when serving a liquid from a bottle, since the filling and emptying of the metering chamber are carried out automatically and sequentially, without any manual operation of the device. The large size of the ports 11 ensures a virtually instantaneous filling of the metering chamber 2, thereby no waiting or downtime are involved. The smaller size of the port 16 allows, by contrast, the liquid to be poured out at a lower rate, such as to prevent splashing and other problems.

By virtue of the transition of the valve assembly 3,4 from one position to the other occuring practically instantaneously, especially on account of the instantaneous shifting of the weights between the stable positions, but also because of their short travel distance, there occurs no leaking of the liquid nor any increase of the metered amount, and this either when serving or returning the bottle to its initial condition.

It will be apparent from the foregoing that a metering device according to this invention also lends itself to a domestic type of utilization. Furthermore, it will be appreciated that by changing the volume of the metering chamber 2, different metered amounts can be obtained, e.g. amounts suitable for aperitives, weak alcoholic liquors and strong alcoholic liquors; in other words, by placing individual metering devices of this invention on top of each bottle, in accordance with their contents, one is enabled to automatically obtain the metered amount desired, simply at the time of pouring the contents out. The volume of the metering chamber 2 can be changed in a variety of manners. For example, there could be provided additional disks on the stem 5 (FIGS. 7 and 8), such as to reduce the capacity of the metering chamber 2 by a desired amount, or stems of different dimensions could be provided, while advantageously retaining the interchangeability of the metering assembly 1 with respect to the other component parts of the device, which could remain the same for each metered amount. To make the transition from one position to the other an even quicker one, it could be possible to provide a small ridge 26 effective to retain the ball 20 in a position corresponding to the inoperative or rest condition of the device and force the ball to stop for a moment past the theoretical position of unstable equilibrium of the assembly, to then move more vigorously to the stable equilibrium position of delivery. Advantageously, the whole device could be formed from a plastics material, which would also afford excellent sealed engagement conditions between the parts intended to interconnect together in sealed relationship. The base 7, provided with the ports 11, could also be an integral part with the metering assembly 1, instead with the supporting body 8. Obviously, the parts 1,8 and 23 could also be a single piece construction.

I claim:

1. An automatic metering device for liquids, in particular alcoholic liquors, for application to a liquid container, comprising a metering chamber, means for sealingly attaching the device to said liquid container, at least one inlet opening and at least one delivery opening at opposite ends of said metering chamber, rigidly interconnected valve means for alternately shutting off said openings, gravity-operated control means associated with said valve means and effective to hold said valve means in a first position where said metering chamber is in communication with said liquid container and shut to the outside environment when said liquid container is standing upright or inclined to a predetermined inclined position where the bottom of said liquid container is at a higher level than said openings, and to suddenly bring said valve means to a second position where said metering chamber is separated from said liquid container and open to the outside environment upon said liquid container reaching an inclination exceeding said predetermined inclined position, wherein said gravity-operated control means comprise a stem interconnecting said valve means axially and having one end projecting out of said metering chamber in sealed relationship therewith and arranged in the proximity of said at least one delivery opening, and a control lever journalled to the metering device, said control lever having one end pivotally connected to said projecting end of said stem and another end supporting at least one weight, said control lever being movable in an oscillation plane between two stable equilibrium positions in accordance with the orientation of the metering device, said positions corresponding to said first and second position of the metering device.

2. A device according to claim 1, characterized in that said at least one delivery opening of said metering chamber is symmetrical with respect to said plane of oscillation of said control lever and is located, with respect to said stem, at a side opposite to that whereto said control lever is pivoted.

3. A device according to claim 1, characterized in that it further comprises a removable cap provided with a delivery spout, said cap covering said projecting end of said stem and an adjacent portion of said control lever.

4. A device according to claim 1, characterized in that said weight comprises a cylindrical housing attached to said control lever and a ball made movable in said housing, the axis of said cylindrical housing forming with the axis of said control lever a smaller angle than 90° on the same side as said metering chamber.

5. A device according to claim 1, characterized in that said weight comprises a cylindrical housing attached to said control lever and a ball made movable in said housing, the axis of said cylindrical housing forming with the axis of said control lever a smaller angle than 90° on the same side as said metering chamber, said cylindrical housing havine a small ridge in the proximity of that position of said ball which corresponds to said first position.

6. A device according to claim 1, characterized in that said stem is guided in seats provided centrally in opposite bases of said metering chamber.

* * * * *